2,964,130
SEPARATION OF RUTHENIUM COMPOUNDS FROM GASEOUS MIXTURES

Bill J. Newby, Idaho Falls, Darrell A. Hanson, Shelley, and Clyde E. May, Idaho Falls, Idaho, assignors to the United States of America as represented by the United States Atomic Energy Commission No Drawing. Filed Oct. 15, 1959, Ser. No. 846,764

10 Claims. (Cl. 183—114.2)

This invention deals with a process of removing ruthenium compounds contained in gas or vapor mixtures, hereinafter referred to as "gaseous mixtures."

In processing neutron-irradiated uranium, waste solutions are obtained which contain the bulk of the fission products; these solutions are highly radioactive. Before disposing of these fission products, the solutions have to be reduced to the smallest possible volume. One of the processes used to accomplish this comprises evaporation of the waste solutions to dryness followed by calcination at about 400° C. in a so-called fluidized bed. A fluidized bed is obtained by passing a gas upwardly through a layer of the solid particles at a sufficient velocity to separate the particles from each other and to maintain them out of contact. In this condition a certain degree of freedom to move is imparted to the solid particles so that the solid-gas mixture behaves much like a liquid and has the ability to flow readily under the influence of a hydrostatic head.

In the fluidization and calcination of the product obtained by the dehydration of the waste solutions, an off-gas is developed that usually contains nitrogen oxides, water, air and radioactive ruthenium, mostly in the form of ruthenium tetroxide. The ruthenium has to be removed before the off-gas can be released into the atmosphere. Processes other than calcination by fluidization result in similarly composed off-gases, and the process of this invention is equally well applicable thereto.

A typical off-gas from the fluidized-bed calcination process contains about 20 mole percent of water, about 60 mole percent of nitrogen, 17 mole percent of oxygen, 3 mole percent of nitrogen oxide-nitrogen dioxide mixture and ruthenium in the order of $1 \times 10^5$ c./m./ml. of solution before evaporation.

It is an object of this invention to provide a process for the removal of ruthenium values from gaseous mixtures by adsorption.

It is another object of this invention to provide a process of removing ruthenium from gaseous mixtures by adsorption on a surface-active material from which the ruthenium can be recovered easily and regeneration of which can be accomplished in the most simple manner.

It is finally also an object of this invention to provide a process of removing ruthenium values from gaseous mixtures by means of an adsorbent, the adsorptive capacity of which is very little impaired by repeated regeneration.

A great number of adsorbent materials have been investigated for the purpose of this invention; for instance, so-called Linde Molecular Sieves, polyolefin resins, stainless steel filters and activated alumina have been tried. However, from these, only the activated alumina showed good adsorptive affinity for the ruthenium, while the three other materials preferentially adsorbed the water from the gaseous mixture. However, the activated alumina had the disadvantage that it bonded the ruthenium too strongly so that elution and regeneration were practically impossible by customary means.

It was found by the inventors against all expectations that silica gel shows a preferential affinity to ruthenium tetroxide and other ruthenium compounds in the vapor or gas state as compared with that to water and also that, in spite of this preferential adsorption, ruthenium can be desorbed readily by contact with water, which was still more unexpected. Silica gel was found not to be attacked by the calcination off-gas. All these features make silica gel the ideal means for removing ruthenium compounds from a gaseous mixture.

Silica gel has a rather high capacity for ruthenium compounds and the average capacity was at least 40 grams of ruthenium per cubic foot of silica gel. The decontamination factor, which is the ratio of ruthenium content of the gas to be treated to ruthenium content left in the gas after it passed through the silica gel, always had a value of between 100 and 10,000.

In order to remove solid particles and nitric acids usually present in the calcination gases and which frequently contain radioactive ingredients, the gas advantageously is first passed through a scrubber and/or through a sintered stainless steel filter. The scrubber can be filled with any liquid suitable, and for most cases water is satisfactory.

The temperature of the silica gel should preferably be held at slightly above the dew point of the off-gas, the dew point averaging about 63° C. The temperature range of between 70 and 100° C. was found to be suitable; however, a temperature between 70 and 80° was preferred. The vapor introduced into the silica gel adsorber usually had a higher temperature, namely a temperature between 120 and 150° C. The gas leaving the silica gel adsorber, the adsorption off-gas, was cooled to remove condensable ingredients. In order to determine the efficiency of the process, the condensate and the remaining condensation off-gas were β-counted for their ruthenium contents. These contents were then compared with the ruthenium content of the feed gas for the adsorber in order to determine the efficiency of the process.

The silica gel was usually loaded to the break-through point, and then the ruthenium was eluted either with mineral acid or with water. As will be shown later, water was found to be just as satisfactory an eluant as mineral acid.

For adsorption purposes, the flow rate of the gas through the adsorber is of no importance; however, it was found that elution was easier from a column that had been loaded slowly than it was from one that had been loaded at a higher rate under otherwise identical conditions. For this reason, it was found, the flow rate of the calcination off-gas should not exceed 0.6 ft./sec.

The water is preferably heated for elution, a water temperature of between 60 and 70° C. being best. In one experiment it was found that 1.75 volumes of elution water per volume of silica gel removed above 99% of the ruthenium adsorbed, the first 0.5 "bed volume" removing about 96%.

In the following Table I the results of some experiments are compiled which show the adsorption efficiency of the various surface-active materials tested. The degree of ruthenium adsorption from calcination off-gas is given as the decontamination factors ("D.F."). In these experiments the gas flowed through the silica gel at a rate of 0.5 ft./sec.

TABLE I

| Adsorbent | Depth of Bed, Inch | Minutes of Successive Operation | Temp. of Adsorbent, °C. | Ruthenium D.F. |
|---|---|---|---|---|
| Empty apparatus | | 180 | 115 | 1.3 |
| Silica Gel | 26 | 180 | 115 | 1,200 |
| Commercial Activated Alumina | 26 | 180 | 115 | 2,300–3,100 |
| "Marlex" Polyolefin Resin | 23 | 180 | 110 | 200–426 |
| | | 90 | | 100–110 |
| Alumina (Calcined at 400° C.) | 30 | 45 | 115 | 40 |
| | | 45 | | 20 |
| | | 45 | | 1.4 |
| | | 45 | | 715 |
| "Linde" Molecular Sieve Type 4A | 28 | 45 | 115 | 369 |
| | | 45 | | 191 |
| | | 45 | | 399 |
| | | 45 | | 800 |
| "Linde" Molecular Sieve Type 5A | 26 | 45 | 115 | 620 |
| | | 45 | | 11 |
| | | 45 | | 10 |
| | | 55 | | 2.6 |
| Type 301 Stainless Steel | 22 | 55 | 115 | 1.4 |
| | | 55 | | 1.3 |
| | | 55 | | 1.3 |
| | | 225 | | 300–600 |
| Commercial Activated Alumina | 20 | 45 | 115 | 73 |
| | | 45 | | 32 |
| | | 45 | | 10 |
| | | 45 | | 5.5 |
| Carpenter-20 Yorkmesh | 13½ | 520 | 80 | 130–225 |

This table clearly shows the excellent adsorption obtained with commercial activated alumina and with silica gel. However, desorption from the activated alumina with water was rather difficult and incomplete so that activated alumina was found to be unsuitable for satisfactory operation.

In the following table the suitability of various eluants for ruthenium removal from silica gel is shown. The silica gel, 27 cc. thereof, was contained in a glass column having an inside diameter of 0.5 inch; the adsorbent column was 12 inches long. The eluant always had a temperature of about 60° C., and it was flowed through the silica gel at a rate of 0.66 ml./min.

TABLE II

| Eluant | Successive Volume of Elutriant Used, ml. | Ruthenium Eluted, Percent of Total Ru Adsorbed |
|---|---|---|
| Water | 20 | 85 |
| | 20 | 3 |
| | 20 | 0.4 |
| | 20 | 0.2 |
| | 20 | 0.1 |
| | | 89 |
| 0.1 N HNO₃ | 20 | 89 |
| | 20 | 2 |
| | 20 | 0.6 |
| | 20 | 0.1 |
| | 20 | 0.1 |
| | | 92 |
| 1 N HCl | 20 | 88 |
| | 20 | 4 |
| | 20 | 0.3 |
| | 20 | 0.3 |
| | 20 | 0.1 |
| | | 93 |
| 0.1 N HCl | 20 | 68 |
| | 20 | 19 |
| | 20 | 2 |
| | 20 | 0.2 |
| | 20 | 0.2 |
| | | 89 |
| 0.1 N H₂SO₄ | 20 | 84 |
| | 20 | 5 |
| | 20 | 0.8 |
| | 20 | 0.1 |
| | 20 | 0.1 |
| | | 90 |

The above results illustrate that there is hardly any difference between the elution with mineral acid and that with water. However, elution with water is preferred, because in that case regeneration of the silica gel for reuse is most simple.

All that is necessary for regeneration of the ruthenium-depleted silica gel is heating of the moist silica gel to from 140 to 180° C.; this may be carried out by simply placing the silica gel in an oven sufficiently hot or else by blowing hot air, for instance having a temperature of 180° C., over the silica gel.

In the following, a few examples are given to illustrate the process of this invention.

Example I

Silica gel that had been contacted for four adsorption-regeneration cycles with calcination off-gas containing most of the ruthenium as the tetroxide was emplyed in a fifth run at a column using a temperature of 80° C. and a vapor flow rate of 0.3 ft./sec.; the bed was 12 inches deep. In this fifth run the silica gel still showed a capacity for the ruthenium of above 60 g./ft.$^3$; it yielded a decontamination factor for the ruthenium of about 2500.

Example II

An adsorption-elution experiment was carried out with silica gel that had been used previously and had been partially regenerated. The residual activity that had remained on the silica gel from the preceding runs amounted to $1.0 \times 10^8$ beta counts per minute. The calcination off-gas that was treated had a total ruthenium content, mostly as the tetroxide, corresponding to $1.9 \times 10^9$ beta counts per minute. The equipment walls were washed with water whereby $0.32 \times 10^9$ beta counts per minute were removed. From this it was calculated that a total of $1.68 \times 10^9$ beta counts per minute of ruthenium had been adsorbed on the filter. After adsorption the silica gel was washed with water whereby $1.48 \times 10^9$ beta counts per minute of ruthenium were removed. This amounts to an elution of about 88% of the total ruthenium adsorbed on the filter.

Example III

A solvent extraction waste solution was calcined at 400° C. for six hours and the calcination off-gas containing most of the ruthenium as the tetroxide was first passed through a scrubber containing water, thence through a silica gel adsorber and finally through a condenser. The adsorber had a diameter of 10 inches and was charged with 75 pounds of silica gel to a depth of about three feet, which amounted to a total volume of 1.72 cubic feet of silica gel. The scrubber was filled with water of room temperature and the condenser through which the adsorber off-gas was passed had a temperature of about 15° C. A fraction of 15.5% of the ruthenium present in the calcination off-gas was removed in the scrubber. The remaining 84.5% was sent through the silica gel column where a decontamination factor for ruthenium of $2.0 \times 10^4$ was achieved.

The silica gel was then regenerated with 30 gallons of water that had a temperature between 55 and 60° C. of the ruthenium adsorbed on the column about 83% was eluted with the first 6 gallons of water, while the total ruthenium recovery from the adsorber with the 30 gallons of water equalled about 57% of the ruthenium fed into the calciner. Sixteen percent had been removed by the scrubber and 5% stayed in the silica gel after elution, which amounted to a material balance of 78%.

It will be understood that this invention is not to be limited to the details given herein but that it may be modified within the scope of the appended claims.

What is claimed is:

1. A process of removing ruthenium tetroxide from waste calcination off-gas mixtures containing water vapor, nitrogen, oxygen and nitrogen oxides comprising contacting said gaseous mixtures with silica gel whereby the ruthenium tetroxide is preferentially adsorbed by said silica gel.

2. The process of claim 1 wherein said gaseous mixtures are at elevated temperature and the silica gel has a temperature of between 70 and 100° C.

3. The process of claim 2 wherein the gaseous mixtures have a temperature of from 120 to 150° C. and the silica gel a temperature of from 70 to 80° C.

4. A process of recovering ruthenium tetroxide from waste calcination off-gas mixtures containing water vapor, nitrogen, oxygen and nitrogen oxides comprising contacting said gaseous mixtures with silica gel whereby said ruthenium tetroxide is preferentially adsorbed by said silica gel, and contacting said silica gel with water whereby said ruthenium tetroxide is eluated.

5. The process of claim 4 wherein the silica gel has a temperature of from 70 to 100° C.

6. The process of claim 5 wherein the silica gel has a temperature of from 70 to 80° C.

7. The process of claim 4 wherein the gaseous mixtures are heated to a temperature of from 120 to 150° C.

8. The process of claim 4 wherein the water has a temperature of from 60 to 70° C.

9. A process of recovering ruthenium tetroxide from waste calcination off-gas mixtures containing water vapor, nitrogen, oxygen and nitrogen oxides comprising heating said gaseous mixtures to a temperature of from 120 to 150° C., contacting said gaseous mixtures with silica gel having a temperature of from 70 to 100° C. whereby said ruthenium tetroxide is preferentially adsorbed by said silica gel, and contacting said silica gel with water having a temperature of from 60 to 70° C. whereby said ruthenium tetroxide is eluted.

10. The process of claim 9 wherein the silica gel has a temperature of from 70 to 80° C.

No references cited.